United States Patent
Ito et al.

(10) Patent No.: US 7,760,245 B2
(45) Date of Patent: Jul. 20, 2010

(54) IMAGING METHOD AND IMAGING APPARATUS

(75) Inventors: Masanobu Ito, Aichi (JP); Hideho Une, Tokyo (JP); Takeo Sugimoto, Tokyo (JP); Hidenori Kushida, Tokyo (JP); Jinyo Kumaki, Tokyo (JP)

(73) Assignee: Sony Corporation, Tokyo (JP)

(*) Notice: Subject to any disclaimer, the term of this patent is extended or adjusted under 35 U.S.C. 154(b) by 1268 days.

(21) Appl. No.: 11/209,628

(22) Filed: Aug. 24, 2005

(65) Prior Publication Data

US 2006/0044411 A1 Mar. 2, 2006

(30) Foreign Application Priority Data

Sep. 1, 2004 (JP) ............................ P2004-254783

(51) Int. Cl.
*H04N 5/228* (2006.01)
*H04N 9/73* (2006.01)
*H04N 5/262* (2006.01)

(52) U.S. Cl. ............ 348/223.1; 348/222.1; 348/240.99; 348/240.1

(58) Field of Classification Search ............... 348/223.1, 348/240.99–240.3
See application file for complete search history.

(56) References Cited

U.S. PATENT DOCUMENTS

| | | | |
|---|---|---|---|
| 6,505,002 B2 * | 1/2003 | Fields | 396/287 |
| 7,148,921 B2 * | 12/2006 | Ikeda et al. | 348/223.1 |
| 7,199,821 B2 * | 4/2007 | Miyao et al. | 348/223.1 |
| 7,200,264 B2 * | 4/2007 | Hubel et al. | 382/167 |
| 7,212,234 B2 * | 5/2007 | Sakaguchi et al. | 348/223.1 |
| 7,212,236 B2 * | 5/2007 | Itsukaichi | 348/240.1 |
| 7,248,294 B2 * | 7/2007 | Slatter | 348/240.99 |
| 7,362,368 B2 * | 4/2008 | Steinberg et al. | 348/349 |
| 7,388,612 B2 * | 6/2008 | Fukui | 348/333.12 |
| 2003/0169348 A1 | 9/2003 | Ikeda et al. | |
| 2003/0218677 A1 | 11/2003 | Nishimura et al. | |
| 2004/0120575 A1 | 6/2004 | Cheng | |
| 2005/0195289 A1 * | 9/2005 | Jacobs et al. | 348/223.1 |

FOREIGN PATENT DOCUMENTS

EP 1 178 685 A2 2/2002

(Continued)

OTHER PUBLICATIONS

Extended European Search Report issued Jan. 19, 2010 for corresponding European Application No. 05 29 1808.

(Continued)

*Primary Examiner*—Jason Chan
*Assistant Examiner*—Pritham Prabhakher
(74) *Attorney, Agent, or Firm*—Rader, Fishman & Grauer PLLC (57) ABSTRACT

An imaging method and an imaging apparatus are provided in which information about white points determined is stored and operation is performed only between the stored white points.

The imaging method includes the steps of: automatically or manually determining at least two white points (Steps S1-2, S1-3 and S1-4); storing the above described at least two white points determined (Steps S5, S8 and S13); and manually or automatically adjusting a white point with the range between the above described at least two white points stored as a white point adjustment range (Step S23).

14 Claims, 8 Drawing Sheets

FOREIGN PATENT DOCUMENTS

| | | |
|---|---|---|
| JP | 04-227187 | 8/1992 |
| JP | 04-363992 | 12/1992 |
| JP | 09-307913 | 11/1997 |
| JP | 2002-051329 A | 2/2002 |
| JP | 2002-094998 | 3/2002 |
| JP | 2002-139665 | 5/2002 |
| JP | 2002-281512 | 9/2002 |
| JP | 2002-290789 A | 10/2002 |
| JP | 2003-060982 | 2/2003 |
| JP | 2003-348601 | 12/2003 |
| WO | WO-99/63479 A1 | 12/1999 |

OTHER PUBLICATIONS

Japanese Office Action issued on Aug. 4, 2009 for corresponding Japanese Application No. 2004-254783.
Japanese Office Action issued Aug. 5, 2008 for corresponding Japanese Application No. 2004-254783.
Partial European Search Report issued Nov. 27, 2009 for corresponding European Application No. 05 29 1808.

\* cited by examiner

IMAGING METHOD AND IMAGING APPARATUS

CROSS REFERENCES TO RELATED APPLICATIONS

The present invention contains subject matter related to Japanese Patent Application JP 2004-254783 filed in the Japanese Patent Office on Sep. 1, 2004, the entire contents of which are incorporated herein by reference.

BACKGROUND OF THE INVENTION

1. Field of the Invention

The present invention relates to an imaging method and an imaging apparatus which include a white balance function, a color adjustment function, and a function capable of varying a zoom setting and a camera imaging direction and a camera imaging range.

2. Description of the Related Art

For example, in the case where an image of an object is picked up with a consumer video camera, in related art, the image has been picked up such that an auto white balance function is used to make a white point correspond with a light source in an imaging environment.

However, in the case where there is a plurality of objects of different light sources in a picture, for example, in an image including outdoor objects beyond a window when taking a picture indoors, if an auto white balance function is still used, a white point only can correspond with a particular light source (of either indoors or outdoors), and so an image may not be picked up favorably.

Further, in Patent Literature 1, since transition between two points can be executed only at a fixed rate, it is difficult at the time of imaging to perform an effective operation such as "terminating a transition as the transition rate is smoothly reduced immediately before the end thereof."

Further, in Patent Literature 1, in the case where a zoom transition is further executed, if with respect to an inner focus lens a focus transition is linearly interpolated from a start point to an end point in a simple manner, the intended focus transition may not be obtained, and an imaging direction and a range may not be changed automatically, along with the above described transition.

[Patent Literature 1] Published Japanese Patent Application No. 2002-139665

SUMMARY OF THE INVENTION

Thus, in the case where an image of an object is picked up as described above, a white point is manually adjusted to the object; however, in an environment where there exists a plurality of objects of different light sources in a picture as described above, an operation to move a white point between those objects is an operation of manually switching a white point, and so there has been an inconvenience that an image lacks smoothness due to the discontinuity of the part where a white point is switched.

Therefore, the present invention addresses the above-identified and other problems associated with conventional methods and apparatuses and provides an imaging method and an imaging apparatus which store information about white points determined and in which operation is only executed between the white points stored.

Further, with respect to color reproduction, optimization is made corresponding with light sources of objects similarly to the case of white points, and so it is aimed to perform favorable image pickup by executing similar processing to the case of white points.

In order to solve the above-mentioned problems, an imaging method according to an embodiment of the present invention includes the steps of; automatically or manually determining at least two white points; storing the above-mentioned at least two white points determined; and manually or automatically adjusting white points with a range between the above-mentioned at least two stored white points as a white point adjustment range.

Thus, by making the range between at least two automatically or manually determined white points as the white point adjustment range for white balance adjustment, a white point can be adjusted smoothly.

Further, an imaging method according to an embodiment of the present invention includes the steps of; automatically or manually determining at least two white points; storing the above-mentioned at least two white points determined; and making a white point of the image transit automatically between the above-mentioned at least two stored white points.

Thus, by automatically making a transition between at least two white points automatically or manually determined, the transition of a white point can be made smoothly.

Further, an imaging method according to an embodiment of the present invention includes the steps of automatically or manually determining at least two color adjustment settings; storing the above-mentioned at least two color adjustment settings determined; and manually or automatically executing color adjustment with a range between the above-mentioned stored color adjustment settings as a color adjustment range.

Thus, by making the range between at least two automatically or manually determined color adjustment settings as the adjustment range for color adjustment, color adjustment can be made smoothly.

Further, an imaging method according to an embodiment of the present invention includes the steps of; automatically or manually determining at least two color adjustment settings; storing the above-mentioned at least two color adjustment settings determined; and making a color adjustment setting transit automatically between the above-mentioned at least two color adjustment settings stored.

Thus, by automatically making a transition between at least two color adjustment settings automatically or manually determined, transition of color adjustment can be made smoothly.

Further, an imaging apparatus according to an embodiment of the present invention includes: white point adjustment means which stores at least two white points automatically or manually determined by means of a white balance function capable of changing a white point of an image by varying color signals among image signals picked up by imaging means and which manually or automatically adjust white points with a range between the above-mentioned at least two stored white points as a white point adjustment range; white-points-range transition means which makes a white point of the image transit automatically between the above-mentioned at least two white points stored; color adjustment means which stores at least two color adjustment settings automatically or manually determined by means of a color adjustment function capable of adjusting color reproduction of an image by varying color signals among image signals picked up by imaging means and which manually or automatically execute color adjustment with a range between the above-mentioned stored color adjustment settings as a color adjustment range;

and color-adjustment-settings-range transition means which makes a color adjustment setting transit automatically between the above-mentioned at least two color adjustment settings stored.

Accordingly, with the range between at least two automatically or manually determined white points as the white point adjustment range for white balance adjustment, a white point can be adjusted smoothly and transition of a white point can be made smoothly.

Further, with the range between at least two automatically or manually determined color adjustment settings as an adjustment range for color adjustment, color adjustment can be made smoothly and transition of color adjustment can be made smoothly.

According to the embodiments of the present invention, by storing information about white points determined and by making only the range between the stored white points as the range for white balance adjustment, transition of a white point can automatically be made in a favorable manner.

Further, since white point transition is automatically executed by automatically making a transition between at least two points where the white point adjustment is stored, a smooth transition can be made, and therefore favorable imaging can be executed.

Further, by storing information about color reproductions determined and by making only the range between the stored color reproductions as the range for the operation, transition of color reproduction can be made automatically in a favorable manner.

Further, since color reproduction transition is automatically executed by automatically making a transition between at least two points where the color reproduction is stored, a smooth transition can be made, and therefore favorable imaging can be executed.

Further, by carrying out the above processing on image effects (a monotone image, a negative image and the like) using color reproduction, a smooth transition between respective image effects including ordinary color reproduction is made possible, and therefore favorable imaging can be executed.

Further, by executing a transition between two points such that a transition rate is smoothly changed based on a transition curve arbitrarily selected by a user, effective operations at the time of picking up an image such as "bringing a transition to a halt with smooth slowdown immediately before the end of the transition" and "smooth acceleration immediately after the beginning of the transition, maintaining a fixed rate in the middle of the transition, and then bringing the transition to a halt with smooth slowdown immediately before the end" can be executed.

Further, when a transition of zoom and focus is simultaneously made with respect to an inner focus lens, a change in an angle of view by zooming and a gradual change in focusing from a distance at the start point to the distance of an end point can be made simultaneously.

Further, transition of an imaging direction and a range can be made automatically along with the above-mentioned transitions.

BRIEF DESCRIPTION OF THE DRAWINGS

FIGS. 6A to 6C are figures showing examples of imaging direction/range moving means.

DESCRIPTION OF THE PREFERRED EMBODIMENTS

Figure 1:
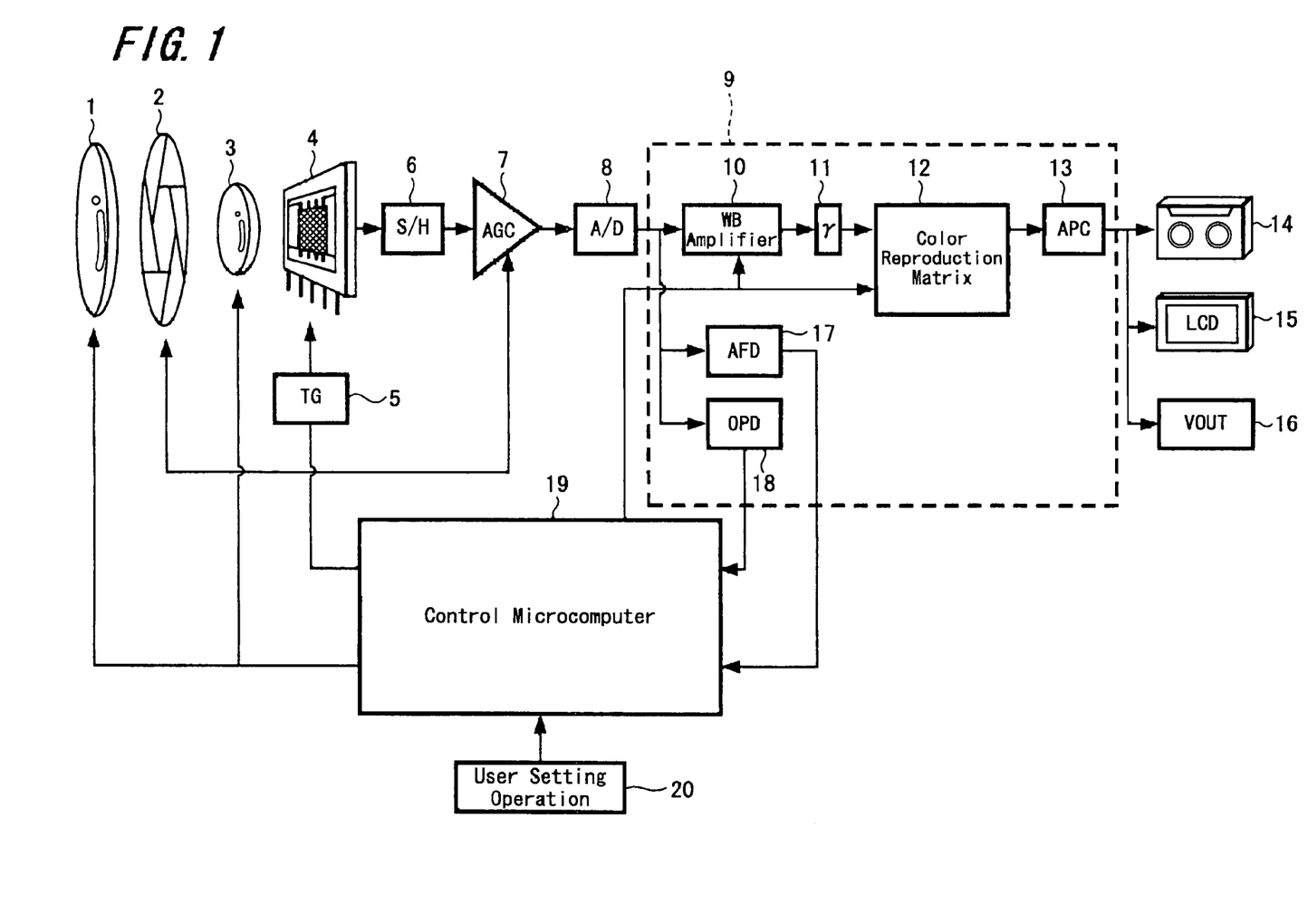
FIG. 1 is a block diagram showing a configuration of an imaging apparatus according to an embodiment of the present invention.

An example of an imaging apparatus according to an embodiment of the present invention is shown in FIG. 1.

FIG. 1 is a block diagram showing in a simplified manner a configuration of the relevant part of an imaging apparatus according to an embodiment of the present invention, which includes: an optical system zoom lens 1; an iris 2; a focus lens 3; an image pick-up device 4; a timing generator (TG) 5; an S/H (Sample/Hold) 6; an AGC (automatic gain control) circuit 7; an A/D (Analog/Digital) conversion circuit 8; a white balance amplifier 10 (hereinafter called a WB amplifier), a γ correction circuit 11, a color reproduction matrix 12, an aperture circuit 13, an autofocus detector 17 and an automatic exposure (AE) detector 18 that are included in a signal processing block 9; a camera control microcomputer 19; a recording medium 14; an LCD (liquid crystal display) display 15; a VOUT (video output) 16; and so forth.

The image pick-up device 4 is a CCD (charge coupled device) or the like in which elements (pixels) converting light into an electrical signal are arranged, and it converts an image formed by light passing through the image pick-up lens 1 into an electrical signal, and then the electrical signal is transmitted to the S/H 6 and the AGC circuit 7 as an analog signal.

The S/H 6 and the AGC circuit 7 samples and amplify the analog signal sent from the image pick-up device 4, and then the signal is transmitted to an A/D conversion circuit 8.

The A/D conversion circuit 8 converts the analog signal amplified in the S/H 6 and AGC circuit 7 to digital image signals (hereinafter called color signals (an R signal [red], a G signal [green] and a B signal [blue])) then to be transmitted to the WB amplifier 10.

The WB amplifier 10 includes an R amplifier, a G amplifier and a B amplifier and amplifies, to a predetermined level in accordance with gain values adjusted by a camera control microcomputer 19, the color signals (the R signal [red], the G signal [green] and the B signal [blue]) sent from the A/D conversion circuit 8 to be output to a circuit at the next step.

The autofocus detector 17 is a detector which detects high-frequency components of a luminance signal for autofocus.

The automatic exposure (AE) detector 18 is a detector which detects luminance and color information in order to execute automatic exposure (AE) and auto white balance control.

When performing the auto white balance operation, the camera control microcomputer 19 adjusts the gain values of an R amplifier, a G amplifier and a B amplifier in the WB amplifier 10 such that the level of the color signals (the R signal [red], the G signal [green] and the B signal [blue]) sent from the A/D conversion circuit 8 will be equal to each another with respect to a white image.

The camera control microcomputer 19 also has the function of setting the gain value of each of amplifiers (the R amplifier, the G amplifier and the B amplifier) in the WB amplifier 10 in accordance with a predetermined setting operation (for example, a selecting operation on a menu screen, or the like) 20 by a user.

Each color signal in which white balance is adjusted receives γ treatment in the γ correction circuit 11 to be within an output signal level, and then it is sent to the color reproduction matrix circuit 12.

In the color reproduction matrix circuit 12, an RGB signal is converted into R-Y, B-Y color signals by an operation, and after the luminance signal (Y) receives outline emphasis in the aperture circuit 13, the color signals are recorded in the recording medium 14.

As an example of the arithmetic processing in the color reproduction matrix circuit 12, there is one shown by the following expression 1.

$$\begin{bmatrix} R-Y \\ B-Y \end{bmatrix} = \begin{bmatrix} K1 & K2 \\ K3 & K4 \end{bmatrix} \begin{bmatrix} R-G \\ B-G \end{bmatrix} \quad \text{[Expression 1]}$$

By changing these arithmetic coefficients K1 to K4 in the color reproduction matrix circuit 12, color reproduction adjustment can be executed.

Figure 2:
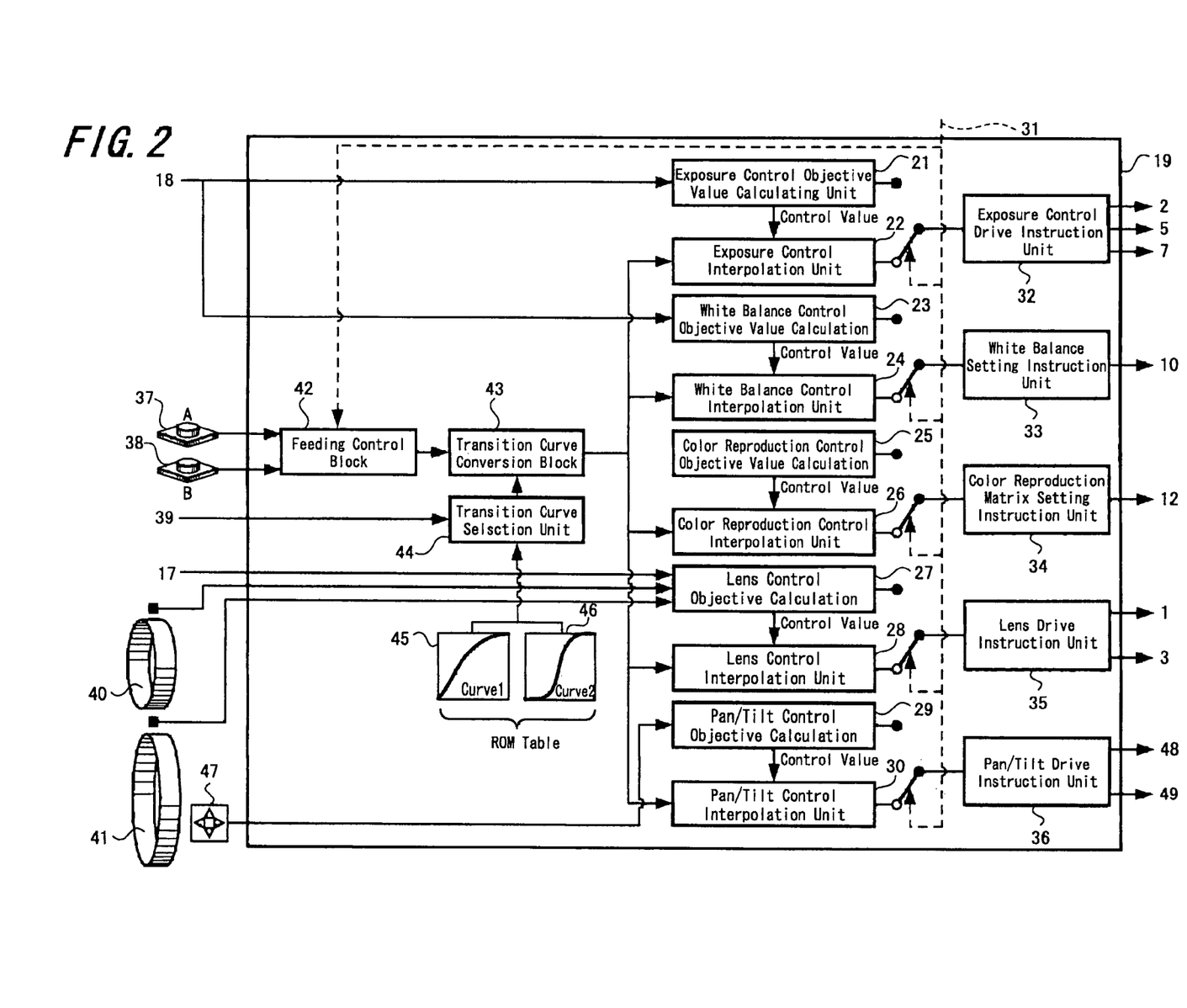
FIG. 2 is a block diagram showing a transition curve conversion function of a control microcomputer.

A functional block diagram for obtaining transition curve conversion in the control microcomputer is shown in FIG. 2.

FIG. 2 shows functions within the camera control microcomputer 19.

In FIG. 2, a memory/execution mode switching unit 31 performs switching operated by a user between the "memory" position for storing control values and the "execution" position for executing transition between control values.

Further, when the above-mentioned memory/execution mode switching unit 31 is selected to be in the "memory" mode, a memory position A is stored by pushing down a control value storing position A button 37. Also, when the above-mentioned memory/execution mode switching unit 31 is selected to be in the "execution" mode, transition to the control value of a memory position A is performed by pushing down this button.

Further, when the above-mentioned memory/execution mode switching unit 31 is selected to be in the "memory" mode, a memory position B is stored by pushing down a control value storing position B button 38. Also, when the above-mentioned memory/execution mode switching unit 31 is selected to be in the "execution" mode, transition to the control value of a memory position B is performed by pushing down this button.

Further, a transition curve switching switch 39 is an input unit for selecting a transition curve by a user, when the above-mentioned memory/execution mode switching unit 31 is in the "execution" mode where transition of a control value is made by pushing down the above-mentioned control value storing position A button or the above-mentioned control value storing position B button.

Further, by turning a manual focus ring 40, the focus lens can be operated manually at the time of manual focusing.

Further, by turning a zoom ring 41, the zoom lens 1 can be operated.

Further, a feeding control unit 42 is a block which turns on a counter for interpolating each control value, when the above-mentioned memory/execution mode switching unit 31 is in the "execution" mode.

Further, a transition curve conversion unit 43 is a block which performs a correction on a linear transition to be a curved transition, using an ROM (read only memory) table selected by a curve selection unit 44 among the ROM tables 45 and 46 of different characteristics with respect to a counter generated by the above-mentioned feeding control unit 42, when curve 1 or curve 2 is selected by the above-mentioned transition curve switching switch 39. If the above-mentioned transition curve switching switch 39 has been selected to be "linear", no correction is added in the transition curve conversion unit 43. The ROM tables of different characteristics shown with the reference numerals 45 and 46 are plural kinds of transition curve tables provided in advance within the ROM.

Further, a pan/tilt input unit 47 is an input device to set the amount of pan/tilt by a user.

Further, an exposure control objective value calculating unit 21 performs calculations for AE (automatic exposure control) based on data supplied from the automatic exposure (AE) detector 18, when the above-mentioned memory/execution mode switching unit 31 is in the "memory" mode. An exposure control interpolation unit 22 executes interpolation between exposure control values based on a transition curve described later on, when the above-mentioned memory/execution mode switching unit 31 is in the "execution" mode.

Further, a white balance control objective value calculating unit 23 calculates control values of the WB amplifier 10 for auto white balance and the like based on data supplied from the automatic exposure (AE) detector 18, when the above-mentioned memory/execution mode switching unit 31 is in the "memory" mode. A white balance control interpolation unit executes interpolation between control values of the WB amplifier 10 based on a transition curve described later on, when the above-mentioned memory/execution mode switching unit 31 is in the "execution" mode.

Further, a color reproduction objective value calculating unit 25 calculates setting values of a color reproduction matrix, when the above-mentioned memory/execution mode switching unit 31 is in the "memory" mode. Further, a color reproduction control interpolation unit 26 executes interpolation between color reproduction matrix control values based on a transition curve described later on, when the above-mentioned memory/execution mode switching unit 31 is in the "execution" mode.

Further, a lens control objective calculating unit 27 performs autofocus control calculations in accordance with data detected by the autofocus detector 17, when the above-mentioned memory/execution mode switching unit 31 is in the "memory" mode. Also, manual focus calculations are performed by operating the focus ring 40. In addition, calculations of zoom control amount and calculations of focus control correction are made by handling the zoom ring 41. Also, a lens control interpolation unit 28 executes interpolation between control values of zoom and focus lenses based on a transition curve described later on, when the above-mentioned memory/execution mode switching unit 31 is in the "execution" mode.

Further, a pan/tilt control objective calculating unit 29 calculates the amount of pan/tilt control based on the controller input 47 for inputting pan/tilt, when the above-mentioned memory/execution mode switching unit 31 is in the "memory" mode. A pan/tilt control interpolation unit 30 interpolates the control amounts of pan/tilt drive control values based on a transition curve described later on, when the above-mentioned memory/execution mode switching unit 31 is in the "execution" mode.

Further, an exposure control drive instruction unit 32 transmits a control signal which converts a control value to a practical drive value with respect to an iris/electronic shutter/gain to be set to the iris 2/TG 5/AGC 7.

Further, a white balance setting instruction unit 33 converts a white balance control value into a setting value of the WB amplifier 10 to set the WB amplifier 10.

Further, a color reproduction matrix setting instruction unit 34 sets a value for the color reproduction matrix 12.

Also, a lens drive instruction unit 35 outputs drive instructions to each motor of the focus lens 3 and the zoom lens 1 based on focus and zoom control values.

Further, a pan/tilt drive instruction unit 36 transmits a drive signal to a pan/tilt drive actuator based on a pan/tilt control value.

Figure 3:
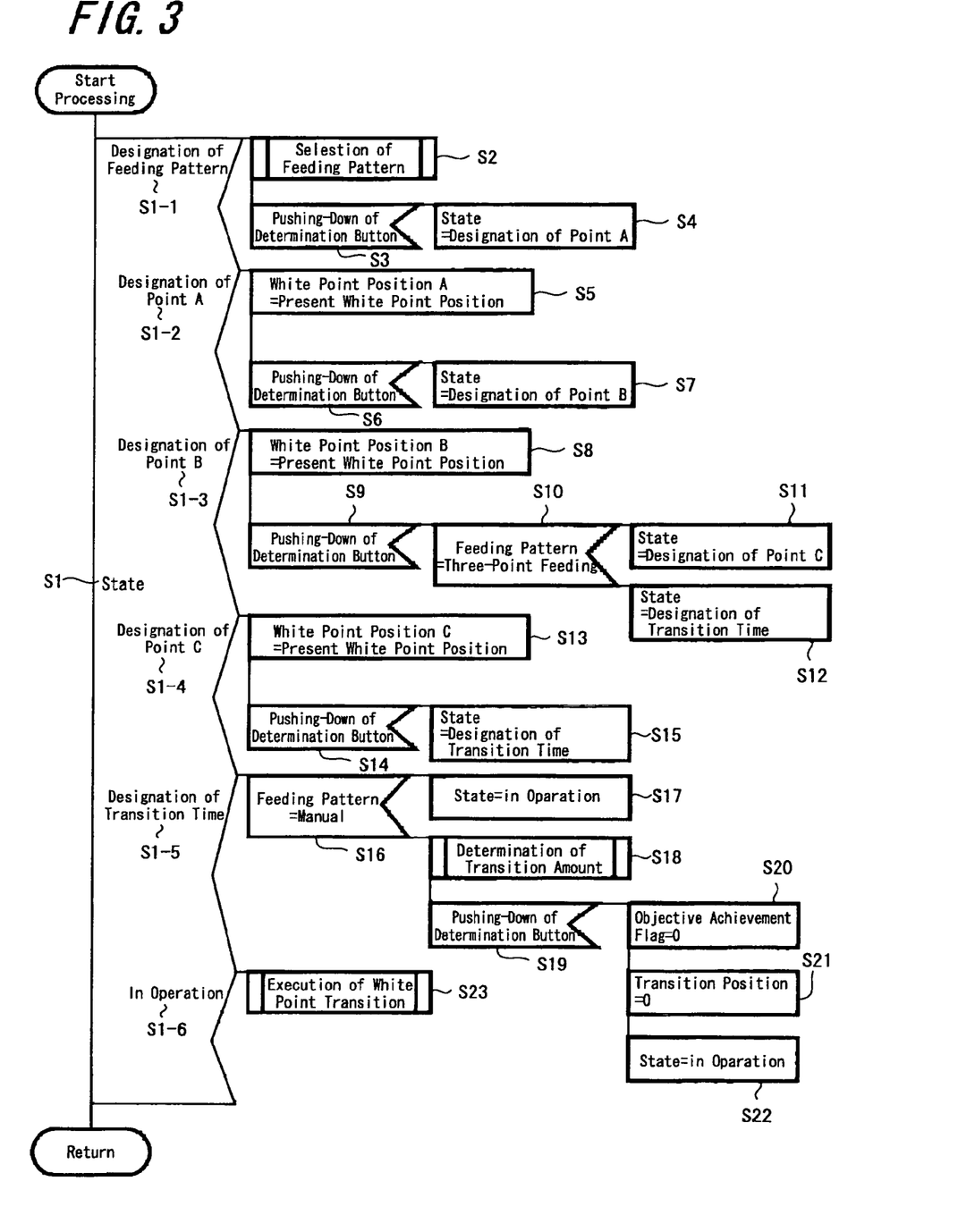
FIG. 3 is a flow chart showing an operation of white balance transition processing.

A flow chart showing an operation of white balance transition processing is shown in FIG. 3.

In FIG. 3, an initial value of a state (Step S1) is the "designation of a feeding pattern" (Step S1-1). Step S2 is the selection processing of a feeding pattern by a user. Although explanations are hereinafter made with respect to examples of three patterns of "feeding between two points", "feeding between three points" and "manual feeding", other feeding patterns also can be designed with ease, such as the one in which further positions to stop are added, for example. Also, a selection may be made by toggling with pushing a button each time; by selecting from a menu; and by pushing buttons corresponding one-to-one, for example. When the pushing down of a determination button in Step S2 is detected (Step S3), the state is in the "designation of point A" (Step S4).

In the state of the "designation of point A" (Step S1-2), the user matches a white point to a first object (light source) which the user desires to match a white point (Step S5). Since Step S5 is repeatedly performed, when the pushing down of a determination button is detected (Step S6), the position of a white point at that time is overwritten each time, and a value when a transition is made to the next state is retained in Step S7. A means for providing the white point position at present may be selected arbitrarily; for example, a method of designating the white point by a manual white balance may be used, or the position of a white point obtained by imaging the vicinity of an object by an auto white balance may be stored as a white point control objective.

Similarly to the "designation of point A", in the state of the "designation of point B" (Step S1-3), the user matches a white point to a second object (light source) to which the user desires to match a white point (Step S8). When the pushing down of a determination button is detected (Step S9), if in Step S10 "three points feeding" is selected, the state is changed to the "designation of point C" (Step S11), and other than that, the state is changed to the "designation of transition time" (Step S12).

Similarly to the designation of points A and B, in the state of the "designation of point C" (Step S1-4), the user matches a white point to a third object (light source) to which the user desires to match a white point (Step S13). When the pushing down of a determination button is detected (Step 14), the state is changed to the "designation of transition time" (Step S15).

In the "designation of transition time" (Step S1-5), a period of time spent on transition between white points designated is determined. In actuality, a transition amount proportional to the reciprocal of the transition time is calculated (Step S18). The transition time is designated by pushing a button corresponding to the increase and decrease of a value, for example.

Further, if "manual feeding" is selected for a feeding pattern (Step S16), a transition amount is determined by pushing down a determination button based on the direction and amount of operation of operational means such as a dial by the user (Step S19), and so when this state of designating transition time is started, an objective achievement flag is reset (Step S20) and a transition position is reset (Step S21) so as to be changed to the next state "in operation" (Steps S17 and S22).

In the state of "in operation" (Step S1-6), processing of white balance transition in which transition of the position of a white point is made between white points designated is executed (Step S23).

With respect to color reproduction, a similar processing can be performed by replacing white points with color reproduction matrix arithmetic coefficients.

Figure 4:
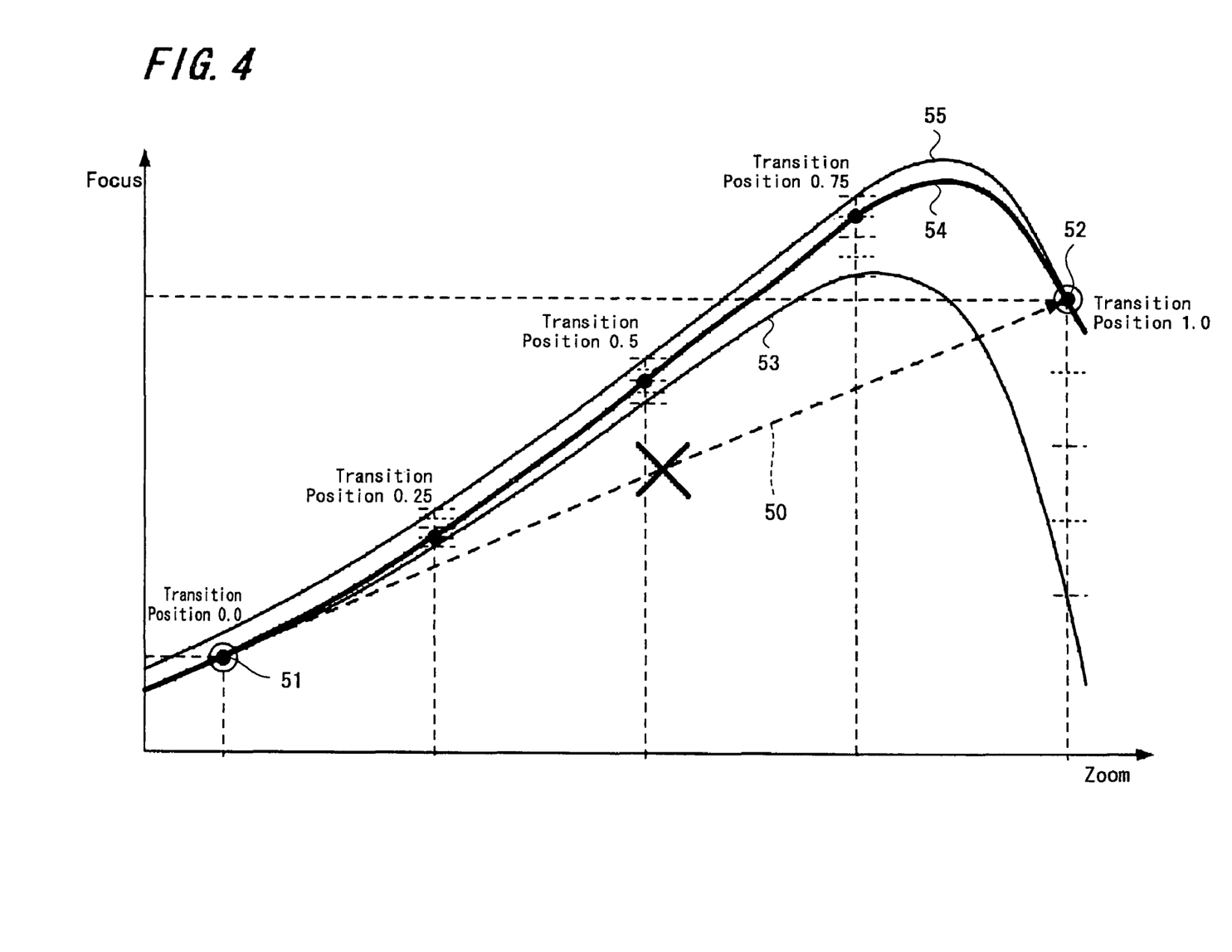
FIG. 4 is a diagram showing an operation when a transition is made with respect to zoom and focus simultaneously.

An operation when transition is made with respect to zoom and focus simultaneously is shown in FIG. 4.

In the above-mentioned transition curve conversion unit 43 in FIG. 2, a linear control objective instruction value 50 with which transition is executed at a fixed rate from a start point 51 to an end point 52 as shown in FIG. 4 is converted into a curved control objective instruction value in the shape of an arbitrary curve shown by 53, 54 or 55, because the focusing may not be performed as intended. This conversion method can be performed, for example, by the following conversion expressions based on the sampling point of a linear control objective value and on the sampling point of an arbitrary curved control objective value in FIG. 4.

Hereupon, when L is a focal distance (or an index capable of being mutually convertible with a focal distance), a function for calculating the focused focal distance L from the zoom lens position Zm and the focus lens position Fc is defined by the following expression 2.

$$L = F\_to\_L(Zm, Fc) \qquad \text{[Expression 2]}$$

A function for calculating the focus lens position Fc from the zoom lens position Zm and the focused focal distance L is defined by the following expression 3.

$$Fc = L\_to\_F(Zm, L) \qquad \text{[Expression 3]}$$

On this occasion, the focal distance: L start point, when the zoom lens position and the focus lens position are both at the start point, can be obtained by the following expression 4.

$$L \text{ start point} = f(Zm \text{ start point}, Fc \text{ start point}) \qquad \text{[Expression 4]}$$

Further, the focal distance: L end point, when the zoom lens position and the focus lens position are both at the end point, can be obtained by the following expression 5.

$$L \text{ end point} = f(Zm \text{ end point}, Fc \text{ end point}) \qquad \text{[Expression 5]}$$

When r is the transition position ($0 \leq$ transition position $\leq 1$), the zoom lens transition objective position: Zm transition and the focus lens transition objective position: Fc transition are given by the following expression 6.

$$Zm \text{ transition} = Zm \text{ start point} + (Zm \text{ end point} - Zm \text{ start point}) \times r \qquad \text{[Expression 6]}$$

where Fc start point_transition=L_to_F(Zm transition, L start point), Fc end point_transition=L_to_F(Zm transition, L end point) is given.

$$Fc \text{ transition} = Fc \text{ start point\_transition} + (Fc \text{ end point\_transition} - Fc \text{ start point\_transition}) \times r$$

Figure 5:
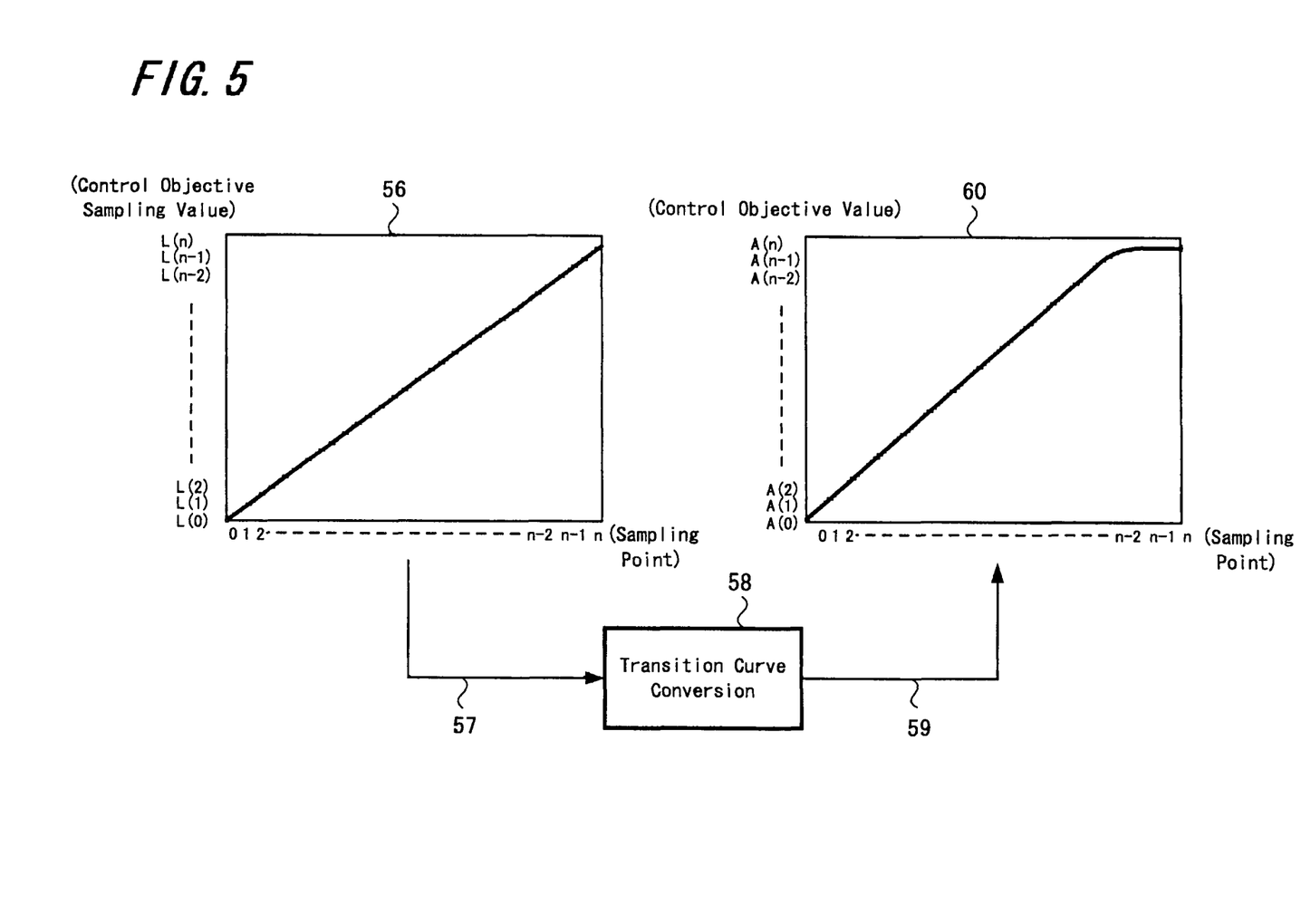
FIG. 5 is a diagram showing an operation of transition curve conversion.

FIG. 5 is a diagram showing an operation of transition curve conversion.

In FIG. 5, the transition curve conversion is performed in the transition curve conversion block 43 on a control objective (input value) 57 based on the linear transition characteristic 56 supplied from the feeding control block 42, and an arbitrary transition curve 60 is obtained by generating a control objective (output value) 59 for each of the driver blocks (zooming, focusing and the like).

Here, with respect to the operation of transition curve conversion in the transition curve conversion block 43, n sampling points are determined in the linear transition characteristic 56, and a conversion from linearity to an arbitrary curve is executed. On this occasion, linear interpolation is executed between two points adjacent to each other.

For example, when X is the control objective input value from the feeding control block 42, Y is the control objective output value for each driver block, n is the sampling point, L(n) is the control objective sampling value at the time of linearity, and A(n) is the control objective sampling value at the time of an arbitrary curve, and if the control objective input value X from the feeding control block 42 is in the range of $L(X) \leqq X < L(X+1)$, the transition curve conversion expression can be obtained by the following expression 7.

$$Y=A(X)+(A(X+1)-A(X))\times(X-L(X))/(L(X+1)-L(X)) \quad \text{[Expression 7]}$$

Figure 6A:
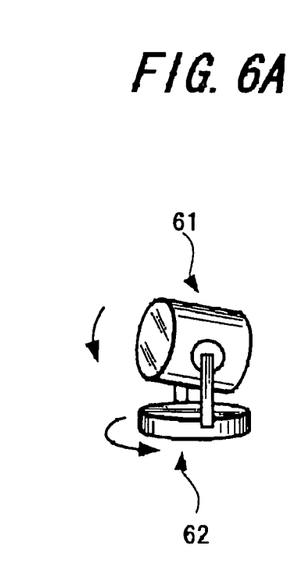
FIG. 6A is a case in which a panning/tilting device is used.
Figure 6B:
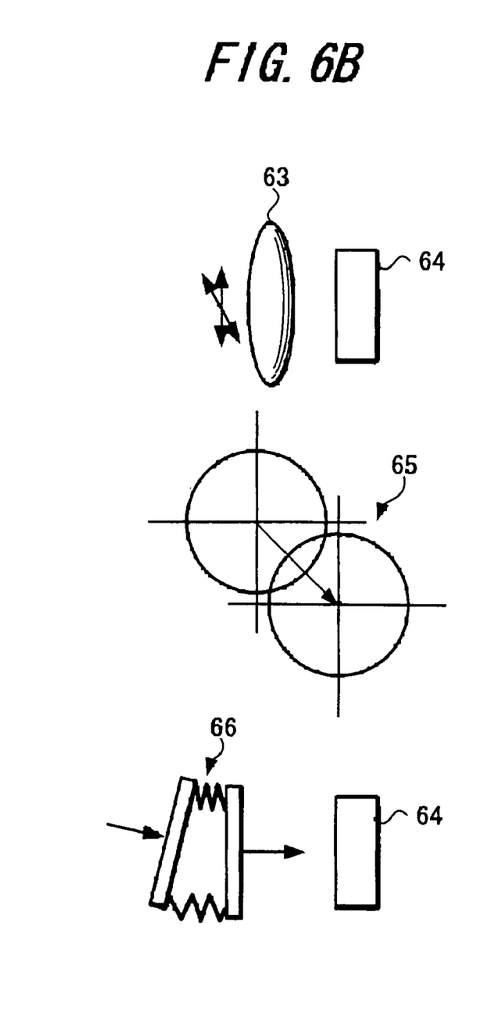
FIG. 6B is a case in which an axis slanting means of an optical system is used.
Figure 6C:
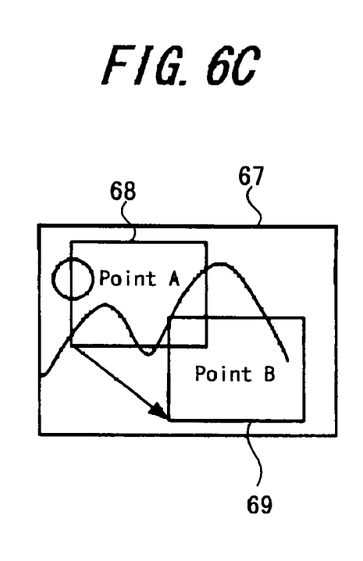
FIG. 6C is a case in which an electronic translational cutoff is used.

Examples of imaging direction/range moving means are shown in FIG. 6.

There are, as shown in FIG. 6A, a method of using a pan/tilt stand in which an imaging apparatus 61 is moved and a panning/tilting device 62 is powered by electricity, as shown in FIG. 6B, a method of changing a light axis of an optical system by means of a lens shift 65 and a variable angle prism 66, and as shown in FIG. 6C, a method of cutting off parts 68 and 69 of an imager 67. The latter two are examples often used as camera shake correction means of an imaging apparatus.

Figure 7:
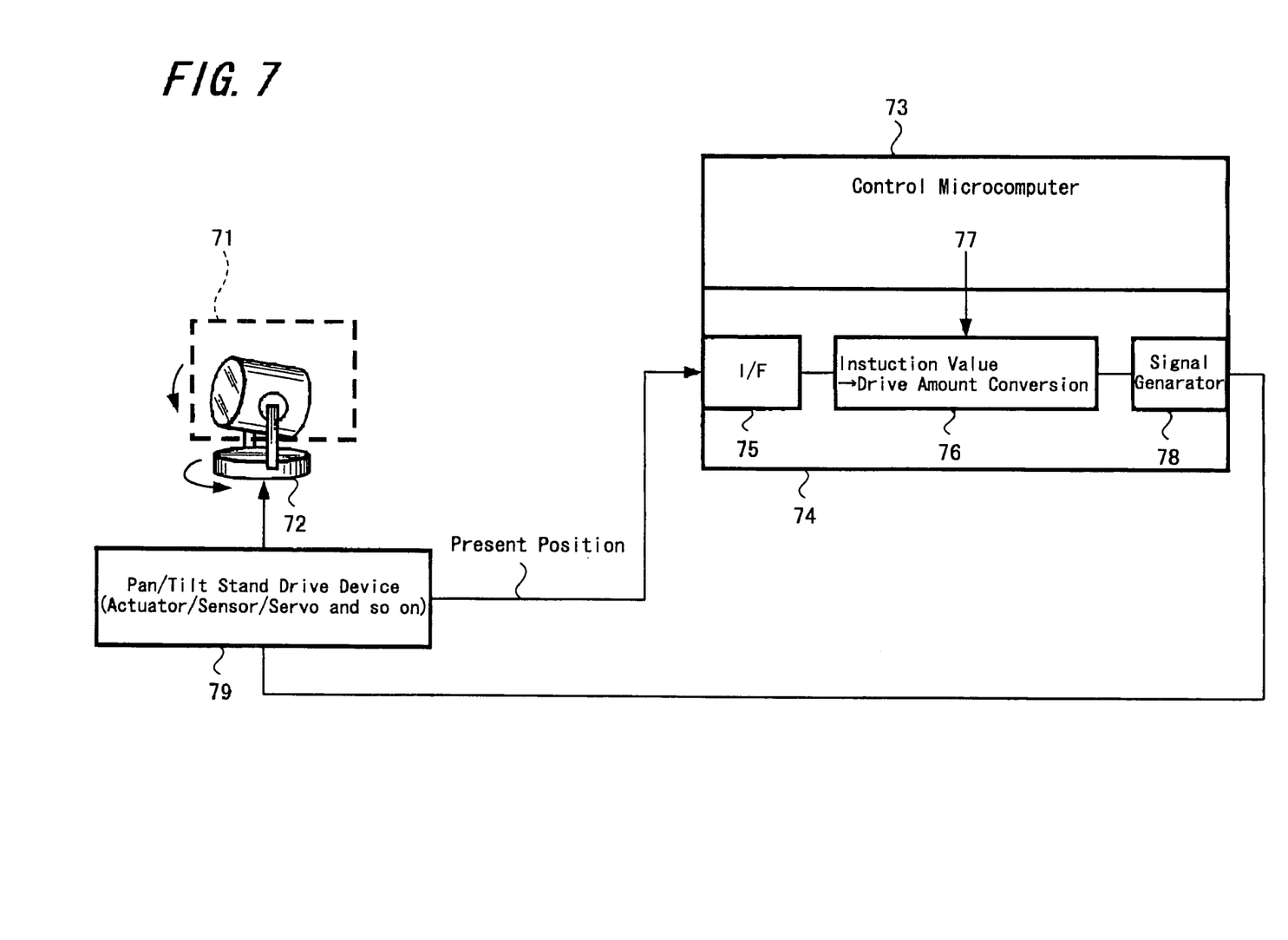
FIG. 7 is a diagram showing panning/tilting using a panning/tilting device.

Panning/tilting using a pan/tilt stand is shown in FIG. 7.

Typically, on receipt of mode information and a between-points transition instruction value input 77 from a remote control or the like, an instruction value drive amount conversion unit 76 of a control microcomputer 73 performs conversion, through an interface 75, into a drive amount of a pan/tilt stand drive device 79, which drives a pan/tilt device through a signal generator 78, and panning/tilting is thus executed. In the case where the above-mentioned "mode in which automatic transition takes place between at least two points stored" has been started, the range between those points is interpolated in accordance with a transition curve and panning/tilting is executed.

Figure 8:
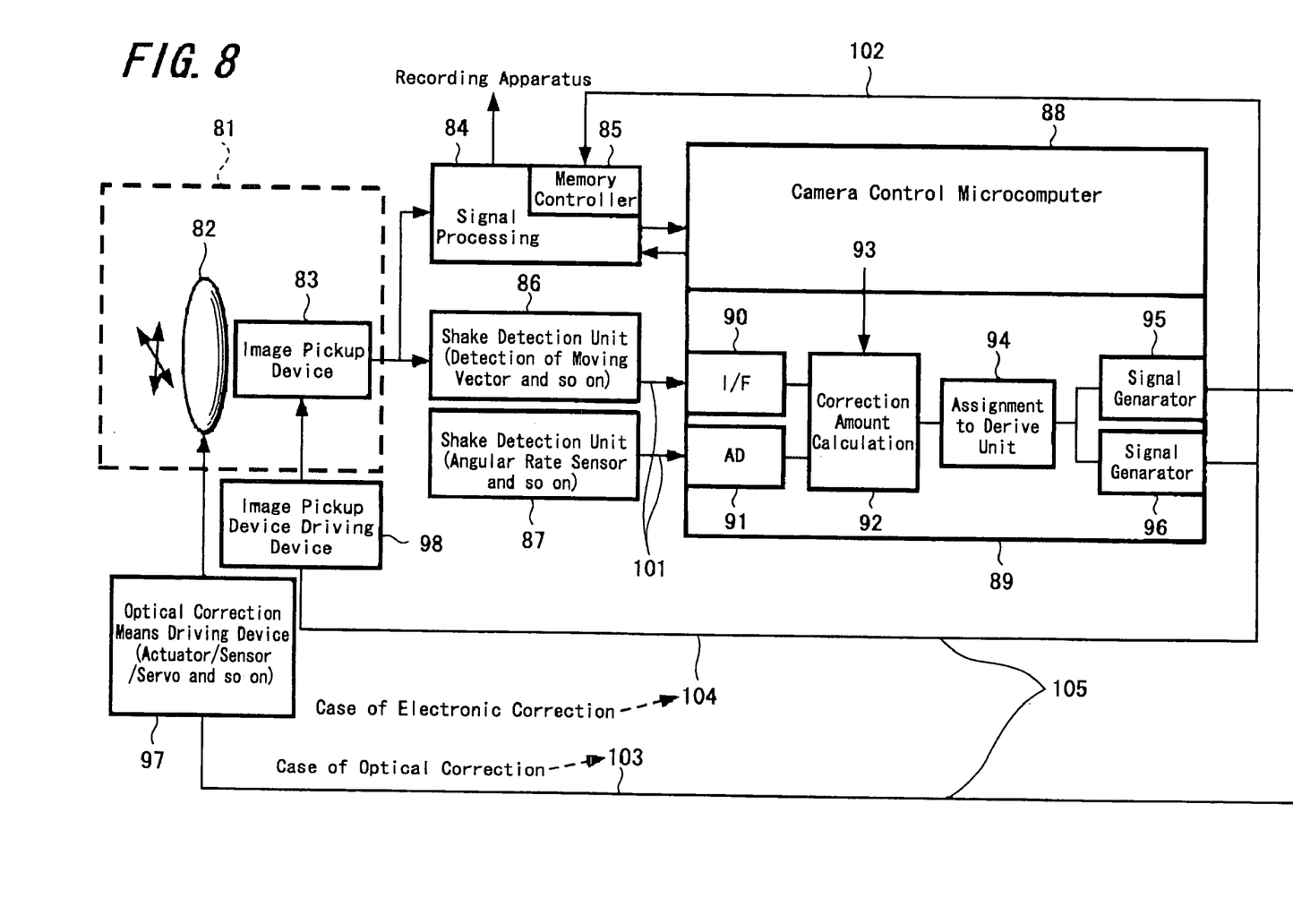
FIG. 8 is a diagram showing an imaging direction/range shift using camera shake correction.

An imaging direction/range shift using similar means to camera shake correction is shown in FIG. 8. As described in the explanation of FIG. 6, since an imaging direction/range can be altered by similar means used for a camera shake correction, camera shake correction is included in the figure. In the case where camera shake correction is not performed, there is no need to provide camera shake detection means and to calculate the amount of camera shake correction.

In the case where the above-mentioned "mode in which automatic transition takes place between at least two points stored" has begun, the drive amount of an optical correction unit 82 and a cut-off region on an imager that is an image pick-up device 83 are calculated along a transition curve between those points, and an image pick-up direction/range is thus moved.

On that occasion, if a shift is made with an amount of camera shake correction being added, a transition between points can be executed along with performing a camera shake correction. (Needless to say, a transition between points can be executed without considering an amount of camera shake correction.)

The configuration shown in FIG. 8 includes an optical system 81 having the optical correction unit 82 and the image pick-up device 83 and a camera shake detecting block, and as an example, includes a shake detection unit 87 such as an angular rate sensor, a shake detection unit 86 which detects a moving vector or the like, a signal processing unit 84, a camera control microcomputer 88, a camera shake correction block 89, an optical correction means driving device 97, an image pick-up means driving device 98, and the like.

First, the camera shake correction block 89 of the camera control microcomputer 88 calculates a correction amount (an amount by which a correction unit moves), using data detected by the shake detection units 86 and 87 on the amount of image shake caused by a camera shake.

In the camera shake correction block 89 of the camera control microcomputer 88, a correction amount calculating unit 92 converts camera shake data to a correction amount (an amount by which a correction unit moves). On this occasion, according to necessity, correction/limitation/conversion is executed to calculate a correction amount (an amount by which a correction unit moves) based on mode information and a between-points transition instruction value shown by the reference numeral 93, which are selected by a user.

Specifically, the correction/limitation/conversion is correction/limitation in accordance with the characteristics of correction means (such as changing moving amount of the correction means in accordance with the position of zooming, limiting an moving amount in accordance with optical restrictions, correcting a phase/gain according to frequency characteristics, and the like) and conversion of a detected shake amount into an amount by which an image is moved by the correction means.

For example, the shake amount of an obtained angular rate is integrated and converted to an angle; and, further, in the case where the moving amount of an image varies in accordance with the zooming position, a change is made in light of the above, and then a correction amount (an amount by which correction means move) is finally calculated.

In this embodiment, at this stage, pan/tilt effects can be obtained by adding a between-points transition instruction value to a correction amount or replacing a correction amount with a between-points instruction value; regarding a between-points transition instruction value as well, correction/limitation/conversion is executed in accordance with the correction means. Accordingly, a transition between points can be performed in accordance with a designated transition curve.

With an assignment to a drive means unit 94, this correction amount is assigned to an optical correction signal generator 95 and an electronic correction signal generator 96.

Subsequently, in the optical correction means driving device 97 and the image pick-up means driving device 98, a control signal is generated based on correction data (an amount by which correction means move) sent from the camera control microcomputer 88, and then based on this control signal, the optical correction unit 82 in the optical system 81 or the image signal capture timing by the image pick-up device 83 and the cutoff range (address) of an image signal are controlled. Then, an image signal sent from the signal processing unit 84 is given a predetermined camera shake correcting processing and transmitted to a next-step recording apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging method in an imaging apparatus having a white balance function capable of changing a white point of an image by varying color signals among image signals picked up by imaging means, comprising the steps of:
   determining at least two white points;
   storing said at least two white points determined;
   adjusting said white points of said image with a range between said at least two stored white points as a white point adjustment range;
   making said white points of said image transit automatically between said at least two stored white points;
   controlling a zoom position;
   storing at least two zoom positions;
   executing transition by making said zoom position transit between said at least two zoom positions;
   storing at least two points of camera imaging directions and ranges; and
   making a point of camera imaging direction and range transit automatically between the two points.

2. The imaging method according to claim 1, further comprising the step of:
   executing automatic transition of said white point between said at least two stored white points in an arbitrarily designated time irrespective of the distance therebetween.

3. The imaging method according to claim 1, further comprising the step of:
   executing automatic transition of said white point between two points by smoothly changing a transition rate based on a transition characteristic arbitrarily selected by a user.

4. The imaging method according to claim 1 further comprising the step of:
   executing automatic transition of said zoom position by making a transition of zoom and focus, in which the start and end positions of focus are calculated each time correspondingly to the change of a zoom position to execute transition by internally dividing the range between the positions.

5. The imaging method according to claim 1, further comprising the step of:
   executing automatic transition of said zoom position between said at least two stored zoom positions in an arbitrarily designated time irrespective of the distance therebetween.

6. The imaging method according to claim 1, further comprising the step of:
   executing automatic transition of said zoom position between two points by smoothly changing a transition rate based on a transition characteristic arbitrarily selected by a user.

7. The imaging method according to claim 1, further comprising the step of:
   making automatic transition of said camera imaging direction and range by moving an imaging apparatus.

8. The imaging method according to claim 1, further comprising the step of:
   making automatic transition of said camera imaging direction and range by moving part of an optical system of the imaging apparatus to use an eccentricity of a light axis center.

9. The imaging method according to claim 1, further comprising the step of:
   making automatic transition of said camera imaging direction and range by using the shift of an imaging range with a part of an image on imaging means being cut off.

10. The imaging method according to claim 1, further comprising the step of:
    executing automatic transition of said camera imaging direction and range between said at least two stored camera imaging directions and ranges in an arbitrarily designated time irrespective of the distance therebetween.

11. The imaging method according to claim 1, further comprising the step of:
    executing automatic transition of said camera imaging direction and range between two points by smoothly changing a transition rate based on a transition characteristic arbitrarily selected by a user.

12. An imaging apparatus comprising:
    white point adjustment means which store at least two white points automatically or manually determined by means of a white balance function capable of changing the luminance of a white point of an image by varying color signals among image signals picked up by imaging means, and which manually or automatically adjust a white point with a range between said at least two stored white points as a white point adjustment range;
    white-points-range transition means for making said white point transit automatically between said at least two stored white points;
    color adjustment means which store at least two color adjustment settings automatically or manually determined by means of a color adjustment function capable of adjusting color reproduction of an image by varying color signals among image signals picked up by imaging means, and which manually or automatically perform color adjustment with a range between said stored color adjustment settings as a color adjustment range;
    color-adjustment-settings-range transition means for making a color adjustment setting transit automatically between said at least two stored color adjustment settings;
    means for storing at least two zoom positions by means of zoom control means, and for manually or automatically executing zooming with the range between said stored zoom positions as a zoom operation range;
    means for making a zoom position transit automatically between said at least two stored zoom positions;
    means for storing at least two camera imaging directions and ranges by means of camera imaging direction and range control means and for manually or automatically controlling the camera imaging direction and range with a range between said stored camera imaging directions and ranges as an operation range; and
    means for making a point of camera imaging direction and range transit automatically between said at least two stored camera imaging directions and ranges.

13. The imaging apparatus according to claim 12, further comprising:
    storage means for storing transition characteristics capable of being arbitrarily selected by a user and at least two camera imaging directions and ranges, which are used for automatic transition of said white point, color adjustment setting, zoom setting, and camera imaging direction and range.

14. An imaging apparatus comprising:
    a white point adjustment unit which stores at least two white points automatically or manually determined by means of a white balance function capable of changing the luminance of a white point of an image by varying color signals among image signals picked up by an imaging device, and which manually or automatically adjusts a white point with a range between said at least two stored white points as a white point adjustment range;

a white-points-range transition unit for making said white point transit automatically between said at least two stored white points;

a color adjustment unit which stores at least two color adjustment settings automatically or manually determined by means of a color adjustment function capable of adjusting color reproduction of an image by varying color signals among image signals picked up by an imaging device, and which manually or automatically performs color adjustment with a range between said stored color adjustment settings as a color adjustment range;

a color-adjustment-settings-range transition unit for making a color adjustment setting transit automatically between said at least two stored color adjustment settings;

a unit for storing at least two zoom positions by means of a zoom control unit, and for manually or automatically executing zooming with the range between said stored zoom positions as a zoom operation range;

a unit for making a zoom position transit automatically between said at least two stored zoom positions;

a unit for storing at least two camera imaging directions and ranges by means of a camera imaging direction and range control unit and for manually or automatically controlling the camera imaging direction and range with a range between said stored camera imaging directions and ranges as an operation range; and a unit for making a point of camera imaging direction and range transit automatically between said at least two stored camera imaging directions and ranges.

* * * * *